United States Patent
Yano et al.

[11] Patent Number: 5,179,473
[45] Date of Patent: Jan. 12, 1993

[54] ZOOM LENS

[75] Inventors: Koutaro Yano, Yokohama; Nozomu Kitagishi, Hachioji; Tsunefumi Tanaka, Yokohama, all of Japan

[73] Assignee: Canon Kabushiki Kaisha, Tokyo, Japan

[21] Appl. No.: 591,264

[22] Filed: Oct. 1, 1990

[30] Foreign Application Priority Data

Oct. 3, 1989 [JP] Japan .................. 1-259650

[51] Int. Cl.$^5$ ............................... G02B 15/14
[52] U.S. Cl. ................ 359/691; 359/680; 359/681
[58] Field of Search ............. 359/680, 681, 691

[56] References Cited

U.S. PATENT DOCUMENTS

| | | | |
|---|---|---|---|
| 4,153,339 | 5/1979 | Tajima et al. | 359/681 |
| 4,198,128 | 4/1980 | Ogino | 359/681 |
| 4,484,799 | 11/1984 | Doi et al. | 359/681 |
| 4,726,667 | 2/1988 | Tachihara | 359/681 |
| 4,807,982 | 2/1989 | Tsuji | 359/680 |
| 4,830,477 | 5/1989 | Kitagishi et al. | 350/428 |
| 4,907,866 | 3/1990 | Takahashi et al. | 350/426 |
| 4,963,005 | 10/1990 | Tsuji | 359/680 |
| 5,000,550 | 3/1991 | Takahashi et al. | 350/426 |
| 5,011,272 | 4/1991 | Kitagishi et al. | 350/427 |

*Primary Examiner*—Bruce Y. Arnold
*Assistant Examiner*—Hung X. Dang
*Attorney, Agent, or Firm*—Fitzpatrick, Cella, Harper & Scinto

[57] ABSTRACT

A zoom lens includes, in succession from the greatly conjugate side to the little conjugate side, a first lens unit having negative refractive power, and a second lens unit having positive refractive power. Zooming from the wide angle side to the telephoto side is effected by at least the second lens unit being moved toward the greatly conjugate side. The zoom lens satisfies the following condition:

$$bf_w/f_w > 1.6,$$

where $f_w$ is the focal length of the entire system at the wide angle end, and $bf_w$ is the distance from the last lens surface of the second lens unit to the little conjugate side.

8 Claims, 11 Drawing Sheets

ZOOM LENS

BACKGROUND OF THE INVENTION

1. Field of the Invention

This invention relates to a zoom lens, and particularly to a zoom lens suitable for projection.

2. Related Background Art

Figure 1:
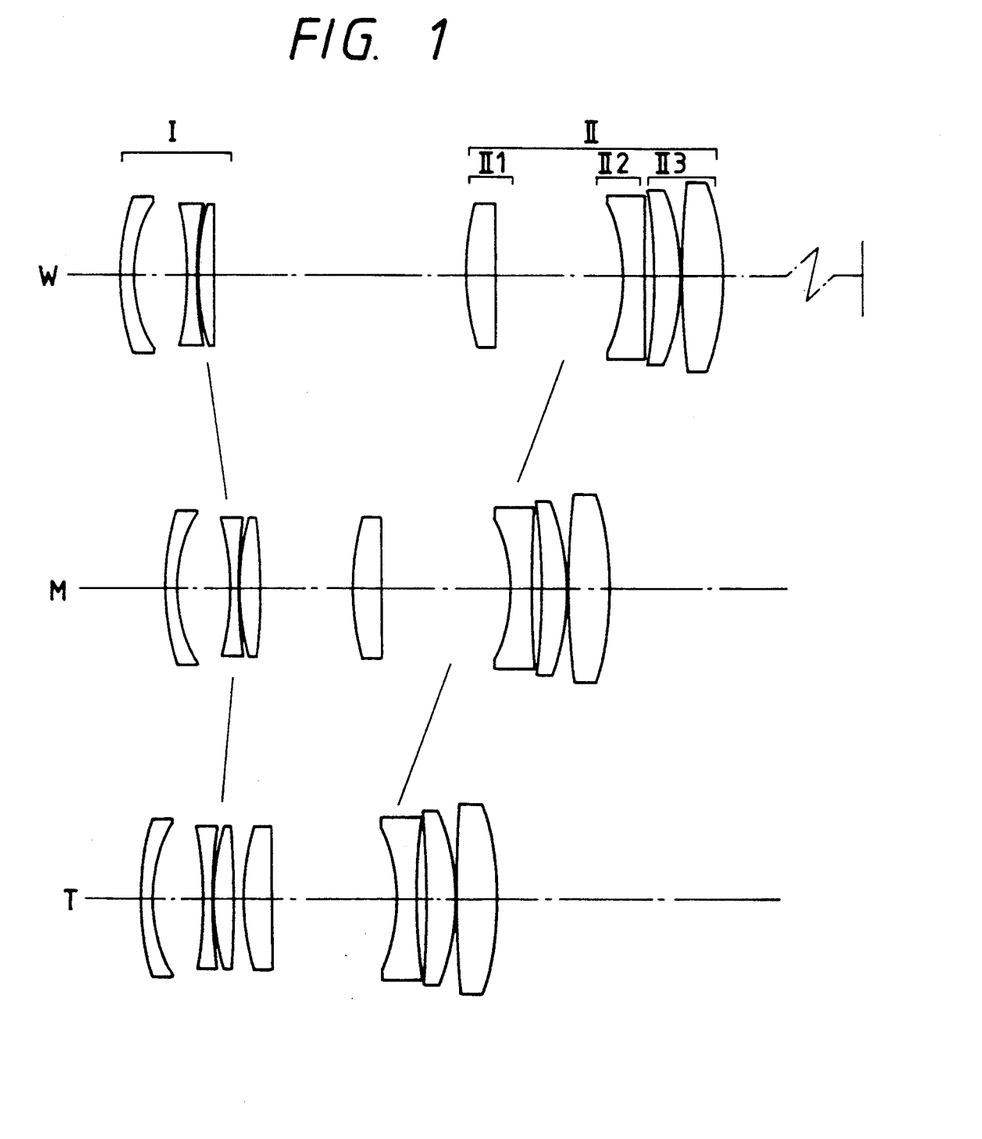
FIGS. 1 to 5 are cross-sectional views of the lenses of numerical value embodiments 1 to 5 of the present invention.
Figure 2:
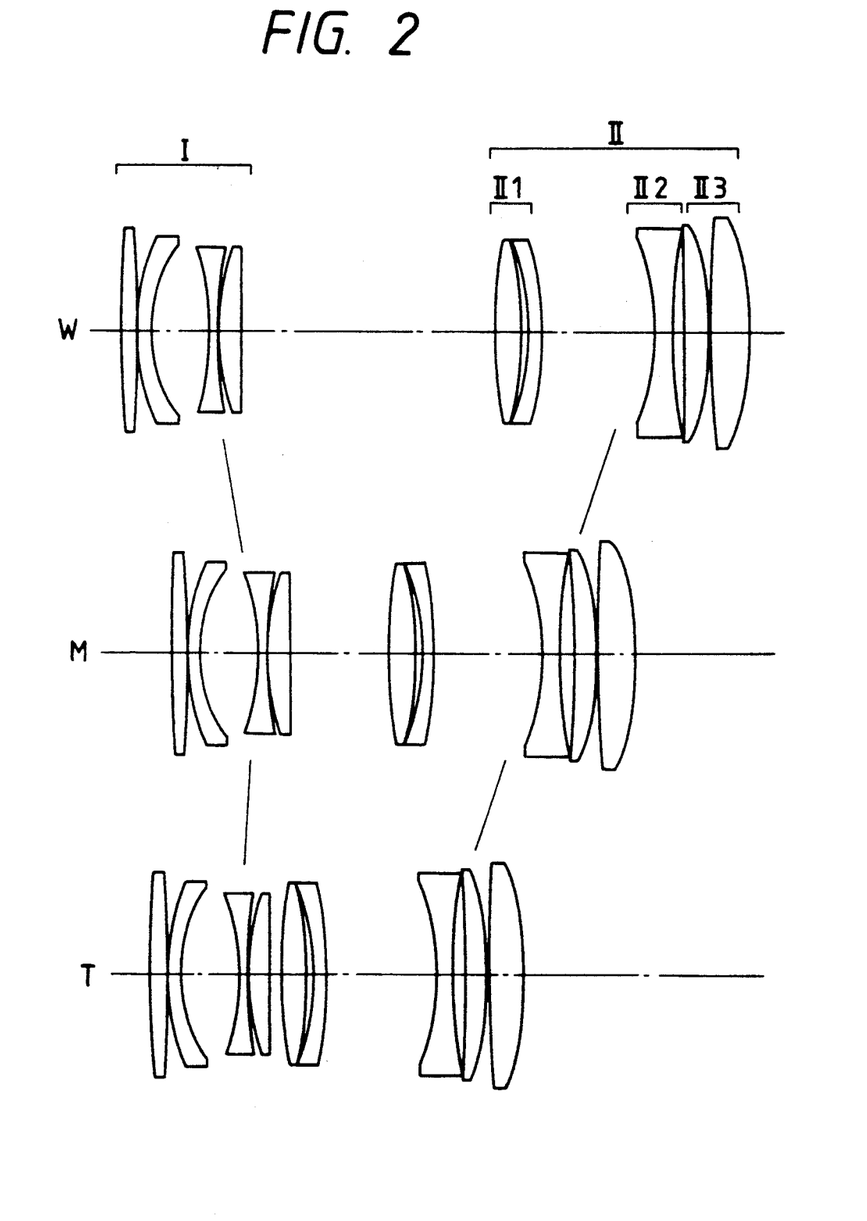
Figure 3:
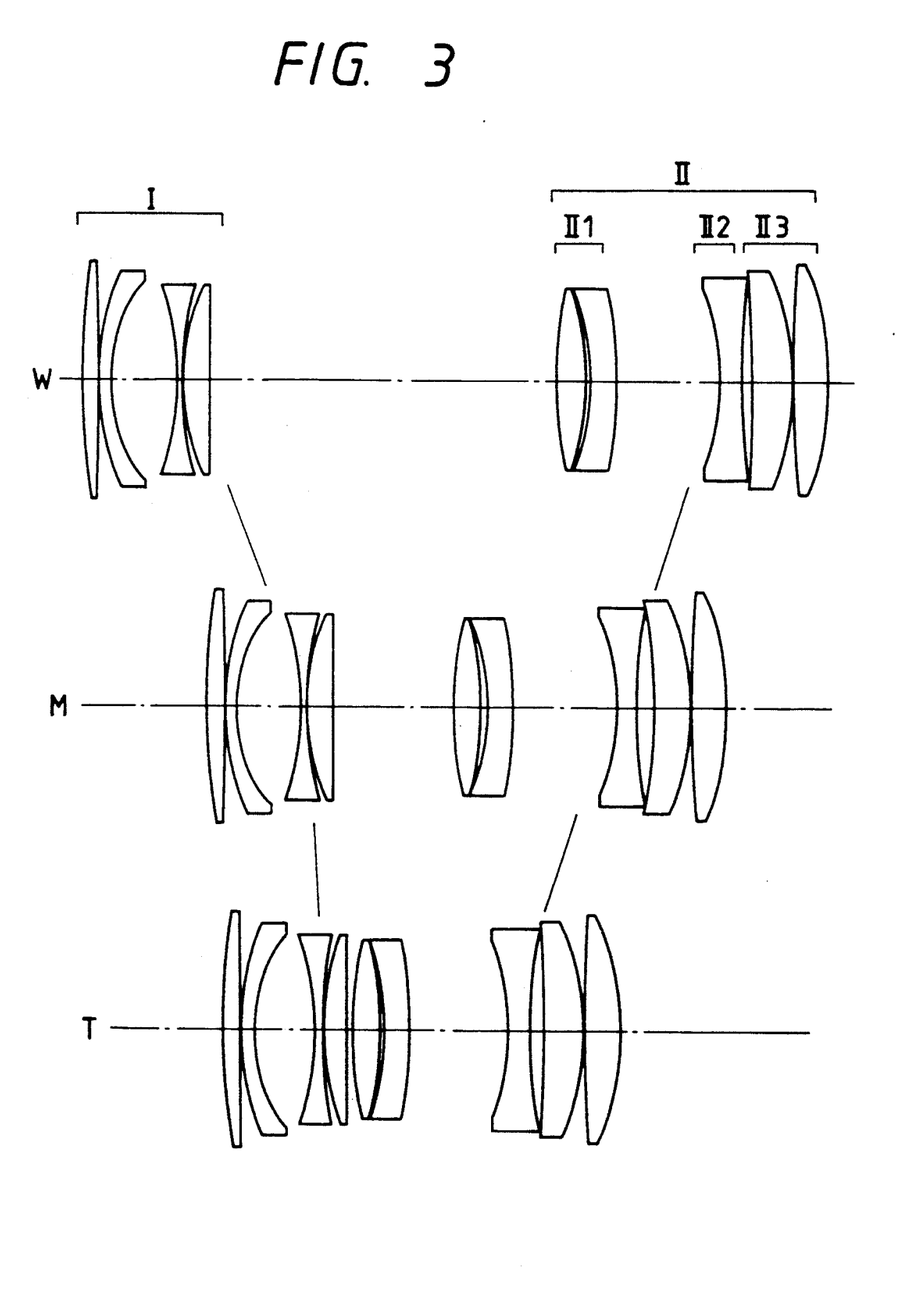
Figure 4:
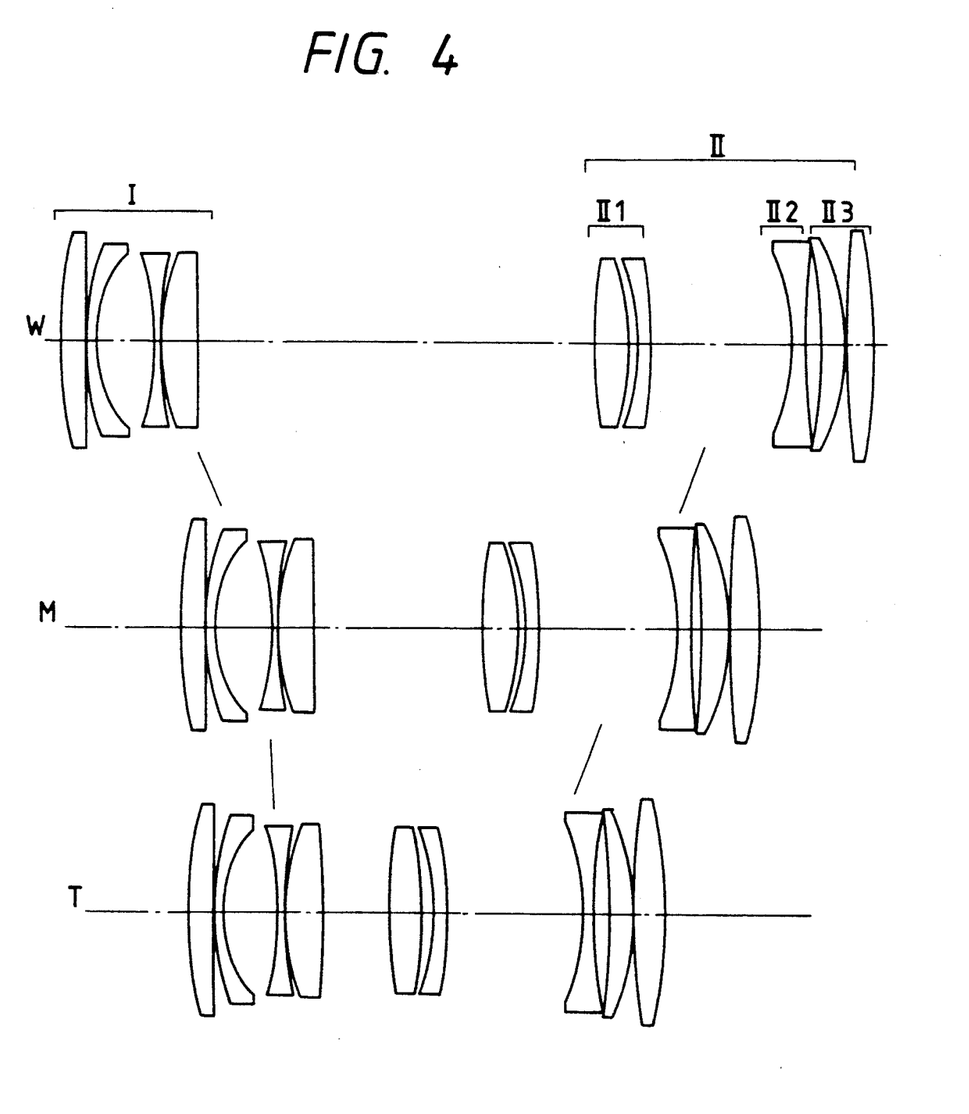
Figure 5:
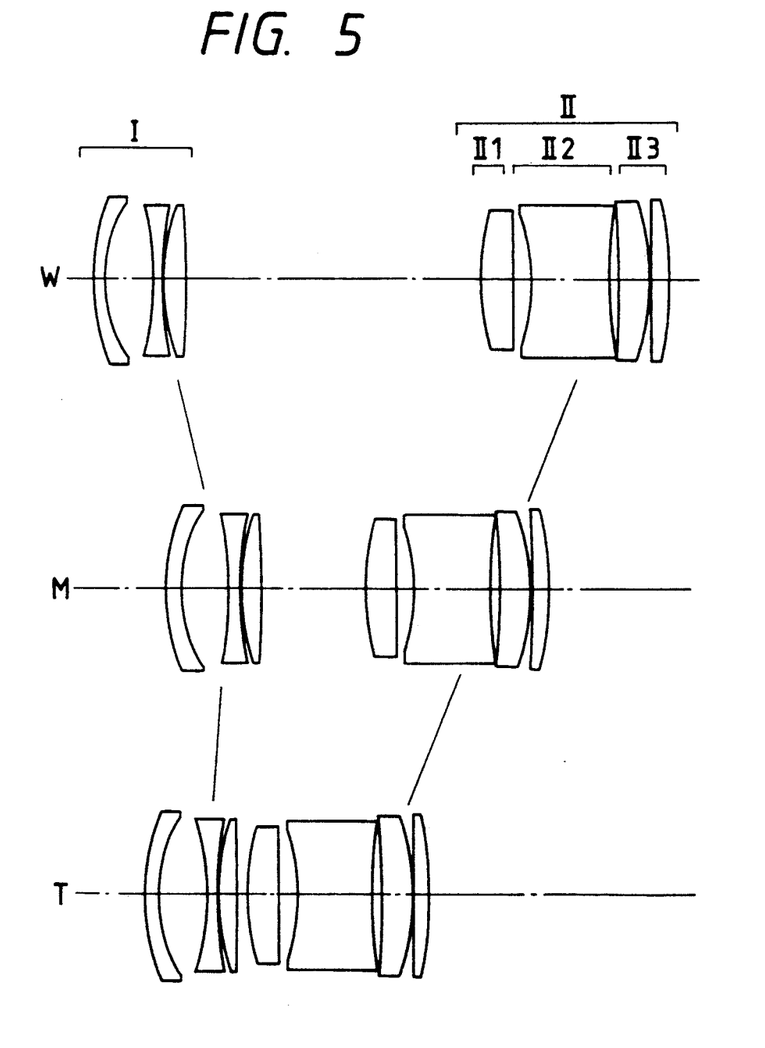
Figure 6:
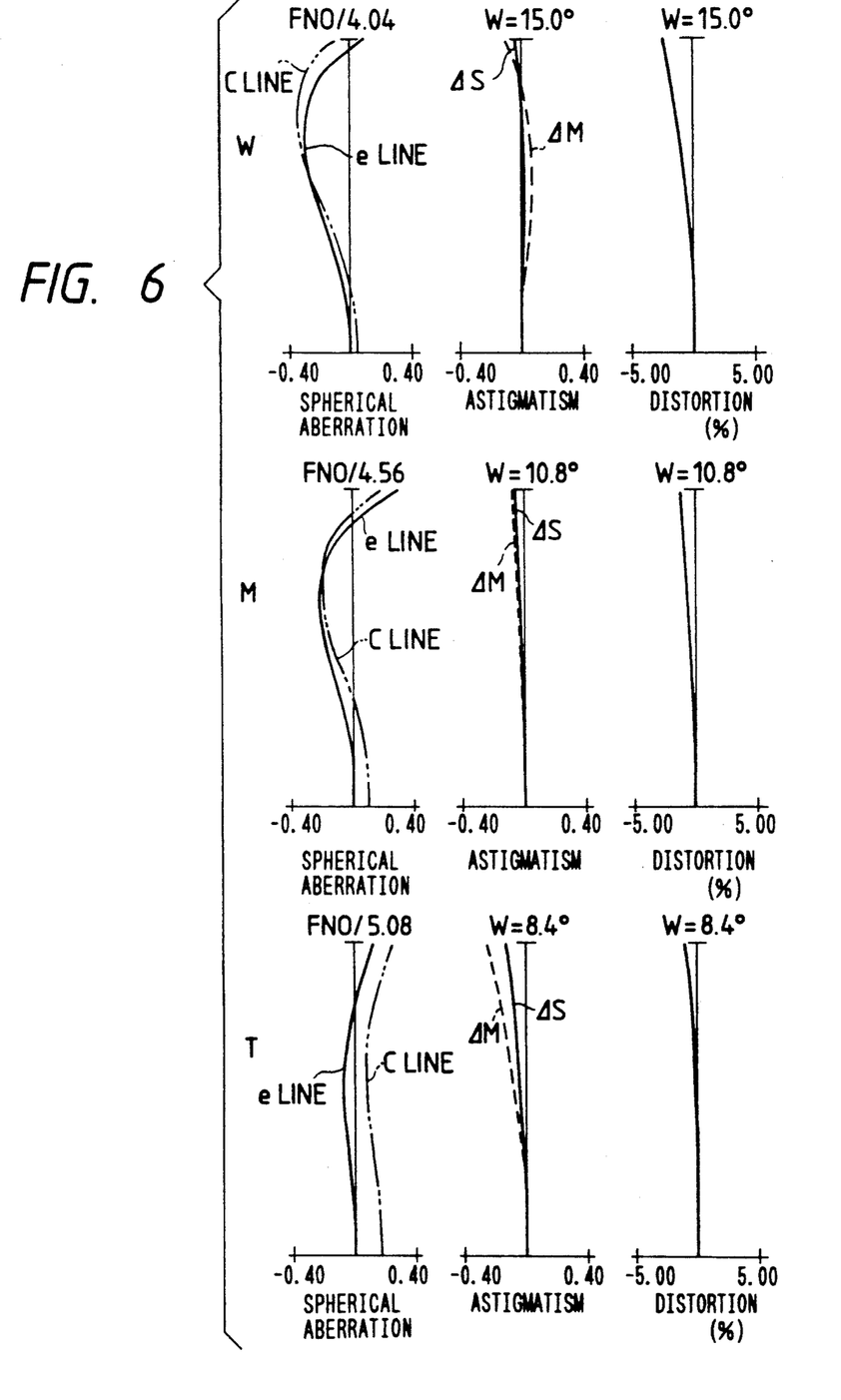
FIGS. 6 to 10 show various aberrations in numerical value embodiments 1 to 5 of the present invention at a magnification 1/70.
Figure 7:
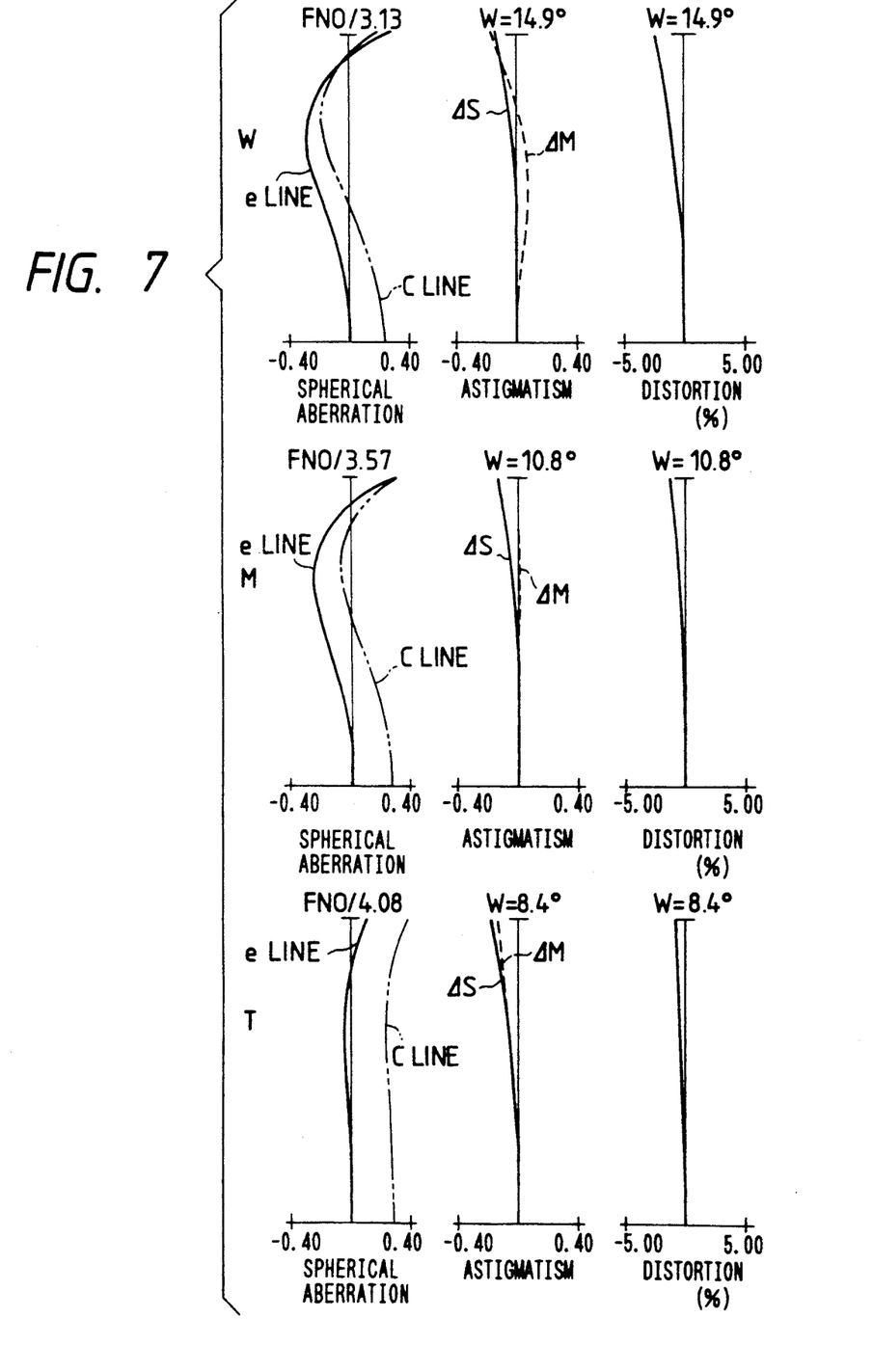
Figure 8:
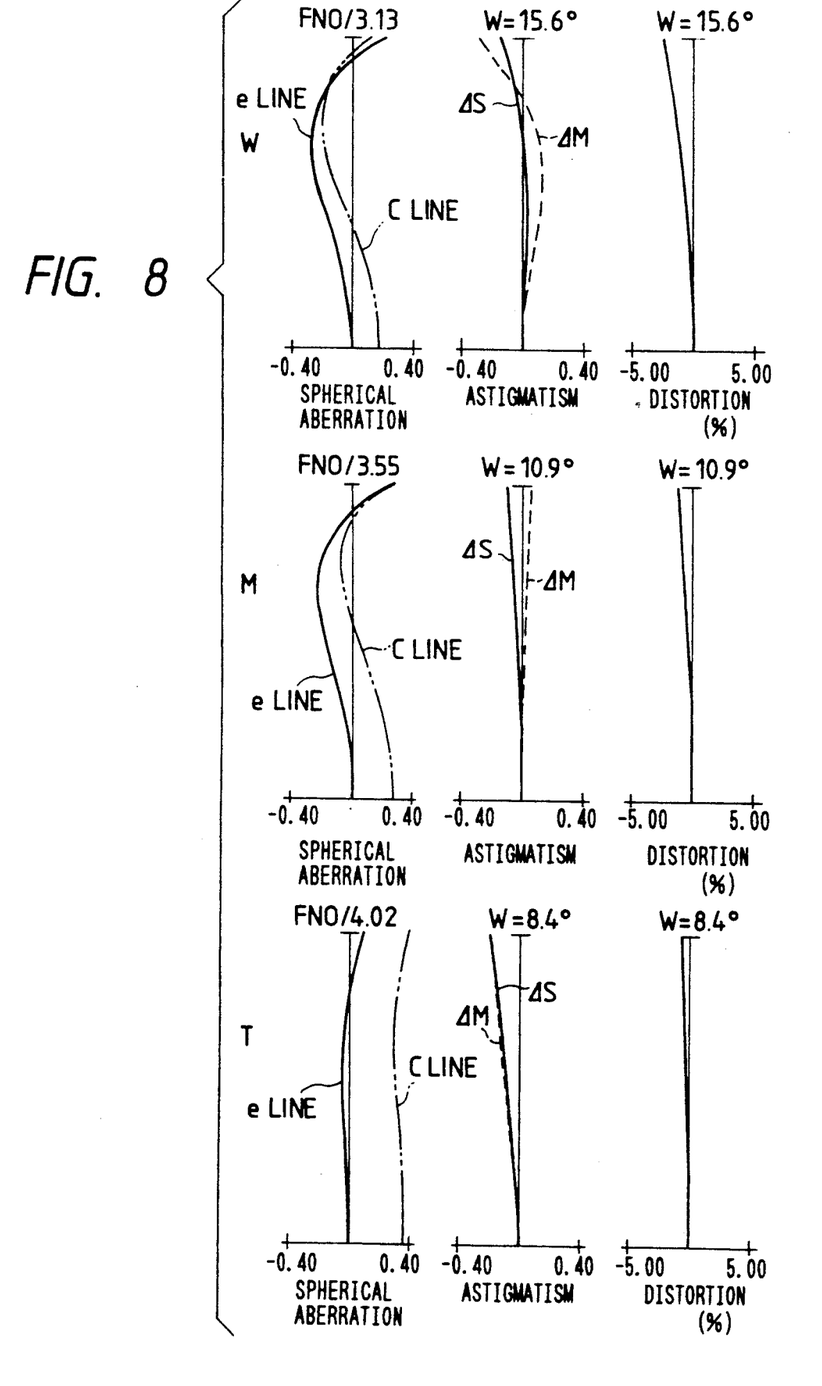
Figure 9:
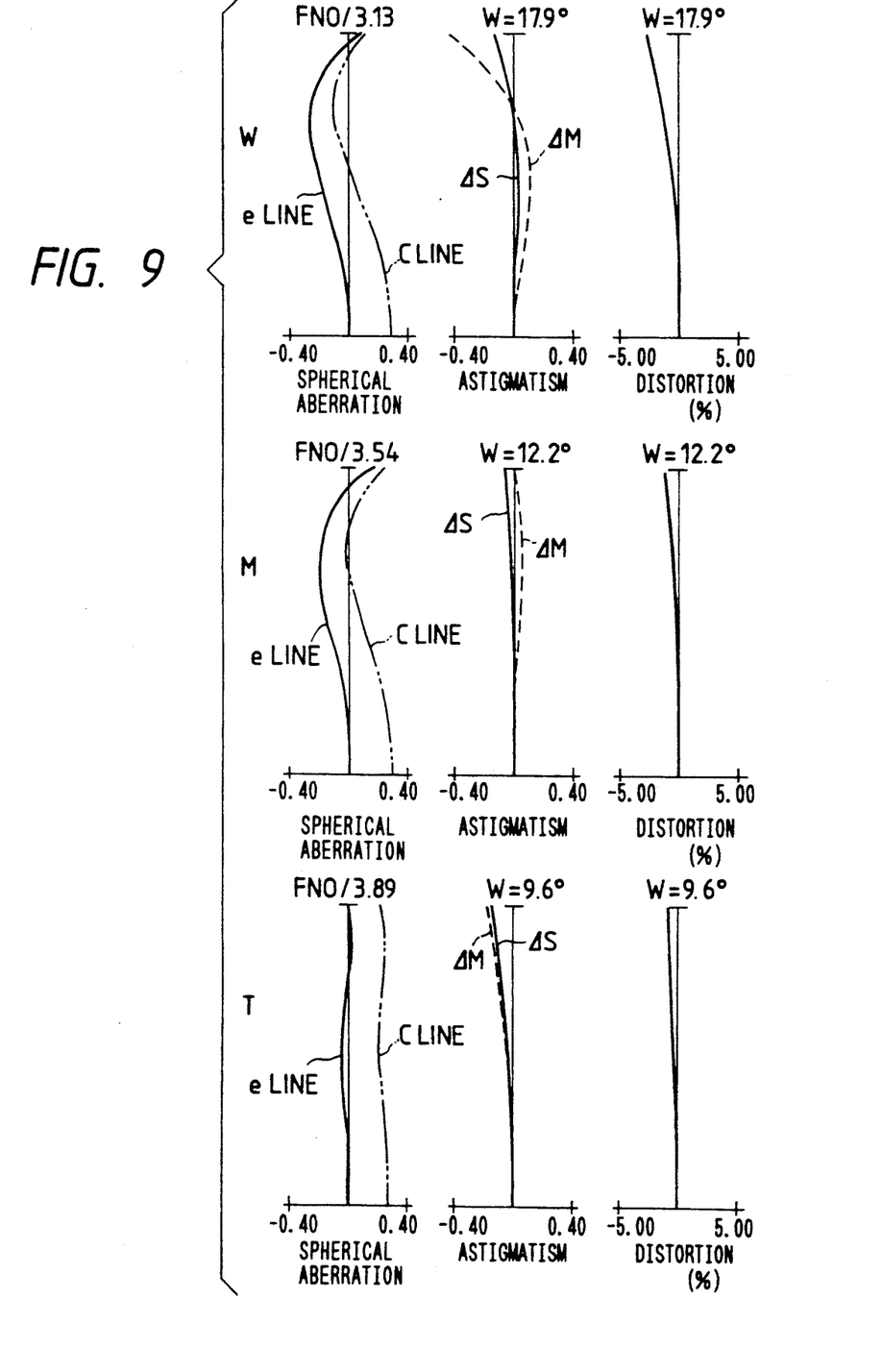
Figure 10:
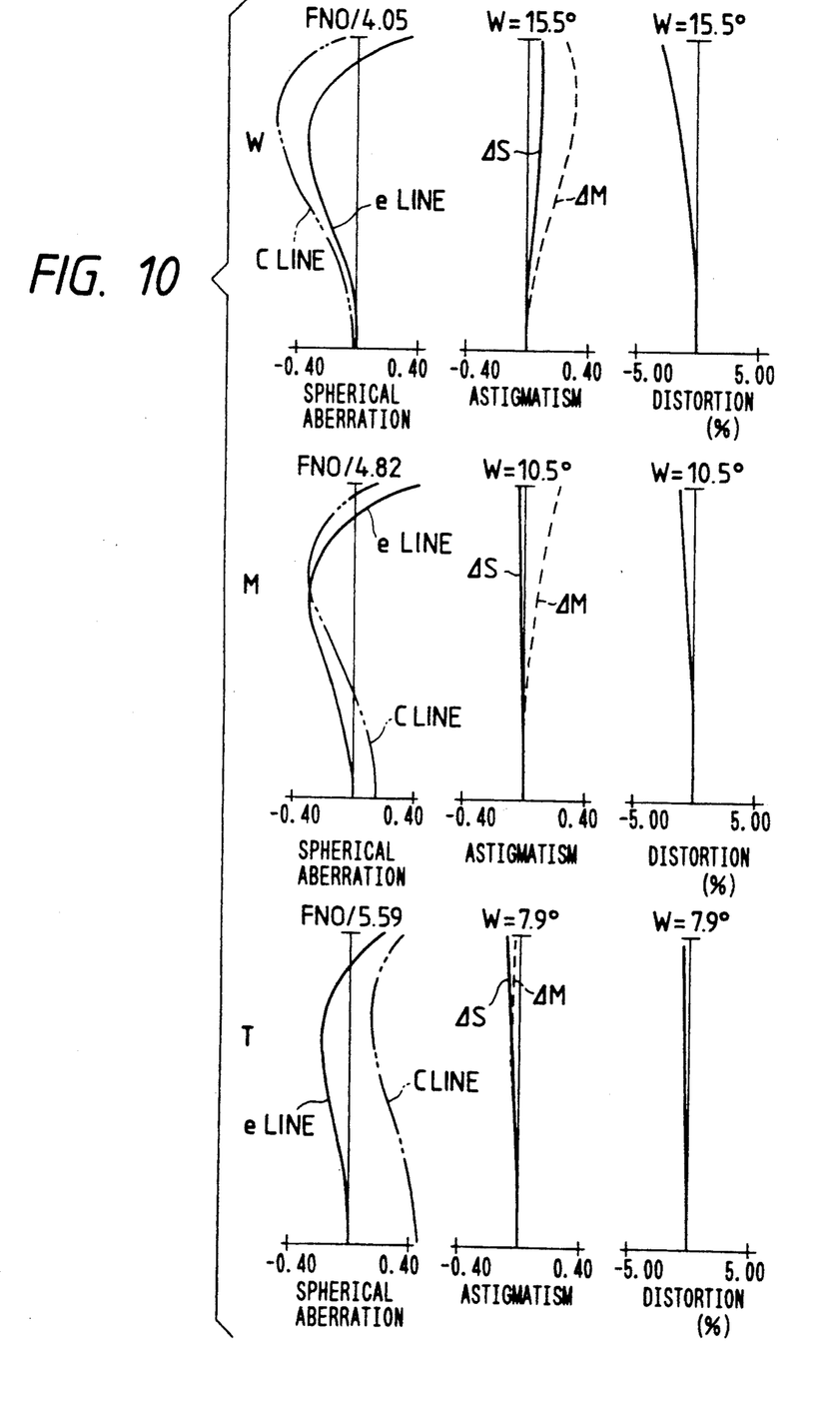
Figure 11:
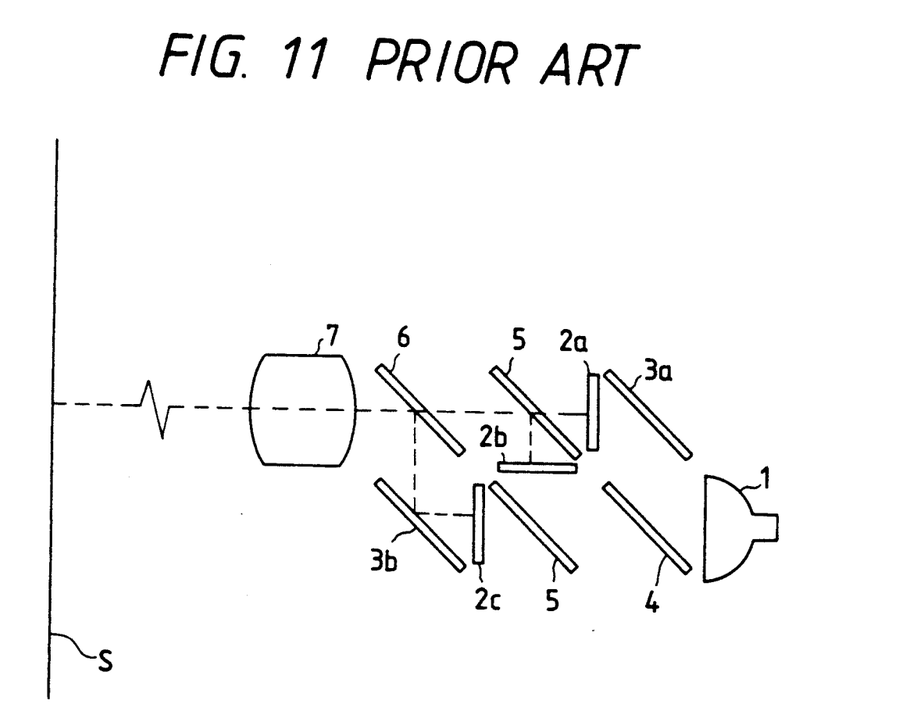
FIG. 11 shows the construction of a projector.

First, FIG. 11 of the accompanying drawings shows the construction of a projection television set for projecting an image formed on popular color liquid crystal. The reference numeral 1 designates a white light source which emits collimated light. The reference characters 2a, 2b and 2c denote liquid crystal display elements, the reference characters 3a and 3b designate reflecting mirrors, the reference numerals 4, 5 and 6 denote a red-reflecting dichroic mirror, a green-reflecting dichroic mirror and a blue-reflecting dichroic mirror, respectively, and the reference numeral 7 designates a projection lens. S denotes a screen. Under such a construction, a long back focal length must be secured by all means from the necessity of disposing at least two mirrors such as reflecting mirrors or dichroic mirrors between the last lens surface of the projection lens and the liquid crystal display element (in the back focal length).

Now, by using a zoom lens comprised of many lens units such as four or five lens units, it becomes easy to maintain a long back focal length and yet obtain a relatively good optical characteristic. However, this poses problems such as a great full length and bulkiness of the lens.

SUMMARY OF THE INVENTION

In view of such problems, the present invention intends to provide a zoom lens securing a relatively long back focal length and achieving compactness and yet having a good optical performance.

BRIEF DESCRIPTION OF THE DRAWINGS

In the aberration graphs, W indicates aberrations at the wide angle end, M indicates aberrations at the medium angle, and T indicates aberrations at the telephoto end.

DESCRIPTION OF THE PREFERRED EMBODIMENTS

The zoom lens of the present invention will hereinafter be described with reference to the drawings.

FIGS. 1 to 5 are cross-sectional views of lenses corresponding to the numerical value embodiments of the present invention which will be described later.

I designates a first lens unit positioned on a screen (greatly conjugate) side, not shown, and having negative refractive power, II denotes a second lens unit positioned on an original image (little conjugate) side such as liquid crystal, not shown, and having positive refractive power. During zooming from the wide angle side to the telephoto side, these lens units are moved in accordance with a movement locus as indicated by solid line, and particularly the second lens unit is moved toward the screen side. W indicates the wide angle end, M indicates the medium angle, and T indicates the telephoto end.

In the present invention, in order to solve the above-noted problems, the following conditions are satisfied:

$$bf_w/f_2 > 1.6 \quad (1)$$

$$0.8 < -e_w/f_I < 2 \quad (2)$$

$$1 < -f_I/f_{II} < 1.5 \quad (3)$$

where $bf_w$ is the distance from the last lens surface of said second lens unit at the wide angle end to the little conjugate side, $f_w$ is the focal length of the entire system at the wide angle end, $f_I$ and $f_{II}$ are the focal lengths of said first lens unit and said second lens unit, respectively, and $e_w$ is the principal point spacing between said first lens unit and said second lens unit.

First, in a zoom lens which is comprised, in succession from the object side, of a first lens unit I of negative refractive power and a second lens unit II of positive refractive power and in which the second lens unit II is moved toward the object side to effect magnification change from the wide angle end to the telephoto end, the back focal length becomes shortest at the wide angle end, but for such zoom lens to be used, for example, as a projection lens for color liquid crystal projection TV, a back focal length corresponding to the space in which a dichroic mirror or the like is disposed is necessary and therefore, it is necessary to satisfy the condition (1).

Now, when supposing a thin-walled system, if the back focal length at the wide angle end is $S_{Rw}$, $$S_{Rw} = (1 - e_w/f_I) \cdot f_w. \quad (4)$$

Accordingly, if the value of $-e_w/f_I$ in the condition (2) becomes greater, the back focal length $S_{Rw}$ of the equation (4) becomes greater and therefore, the back focal length $bf_w$ in a thick-walled system also tends to become longer. However, if the value of $-e_w/f_I$ becomes too great beyond the upper limit of the condition (2), the size itself of the entire lens system will become large.

The condition (3) which determines the ratio of the focal length of the first lens unit I to the focal length of the second lens unit II is for keeping the size, the back focal length and the optical performance of the entire lens system good, and if the upper limit of the condition (3) is exceeded, the focal length of the first lens unit will become great and therefore it will become difficult to keep the back focal length long, and if an attempt is made to keep it long, it will be necessary to make $e_w$ great and thus, the size of the entire lens system will become large. If conversely, the lower limit of the condition (3) is exceeded, the image plane will become too under at the wide angle end and the correction thereof will become difficult. Accordingly, where such zoom lens is used as a projection lens, projection of great magnification at a short distance will become difficult.

Also, in the present invention, the secure a relatively long back focal length and yet maintain a good optical performance, when said second lens unit has at least one negative lens and with a negative lens $II_2$ of the greatest negative refractive power in it as the boundary, the focal length of a lens unit $II_1$ on the greatly conjugate side in said second lens unit is $f_{II1}$ and the focal length of a lens unit $II_3$ on the little conjugate side is $f_{II3}$, the following condition may preferably be satisfied:

$f_{II1}>0, f_{II3}>0, 1<f_{II1}/f_{II3}<5$ (5)

The condition (5) is a condition which appropriately determines the refractive power arrangement of positive lens units positioned forwardly and rearwardly of the negative lens $II_2$, and if the upper limit of the condition (5) is exceeded, for example, the screen side principal point of the second lens unit comes toward the image side and therefore, this is a direction in which the principal point spacing $e_{wT}$ can be made great without the lens system being made bulky and which is advantageous to keep the back focal length long, but the refractive power sharing of the positive lens unit $f_{II3}$ on the little conjugate side will become too strong and therefore, the occurrence of barrel type distortion aberration particularly when viewed on the little conjugate surface at the wide angle end will become great and the correction thereof will become difficult.

On the other hand, if the lower limit of the condition (5) is exceeded, it will become difficult to keep the back focal length long. Also, if the focal length $f_{II3}$ becomes great, that is, if the power of the lens unit $II_3$ becomes weak, where such zoom lens is used, for example, as a lens for a color liquid crystal projector, the off-axis light beam from a liquid crystal display element will emerge as a substantially parallel light beam and therefore, it will become difficult to achieve compactness of the lens and yet secure off-axis light rays sufficiently.

Further, when the air space between the lens unit on the greatly conjugate side and the negative lens $II_2$ in the second lens unit II is d, by designing the second lens unit II so as to satisfy the condition that $0.25<d/f_{II}<0.4,$ (6)

a zoom lens of a long back focal length can be achieved with greater ease.

That is, to make the back focal length long, as previously described, the construction of the second lens unit can be made such that the object side principal point of the second lens unit is on the image side, and this can be achieved easily by making $d/f_{II}$ in the condition (6) great. That is, if conversely, the lower limit of the condition (6) is exceeded, $d/f_{II}$ will become small and therefore, it will become difficult to keep the back focal length long. Also, the incidence height of the off-axis light ray onto the negative lens in the second lens unit will become too low and distortion aberration at the wide angle end cannot be corrected. If conversely, the upper limit of the condition (6) is exceeded, the second lens unit will become bulky and it will become impossible to achieve a compact zoom lens. Also, the incidence height of the off-axis light ray at the wide angle end will become great and therefore, astigmatism and distortion aberration will occur and the correction thereof will become difficult, and this is undesirable.

Also, when the lens thickness of the negative lens in the second lens unit is d', the second lens unit may be designed so as to satisfy the following condition:

$0.18<d'/f_{II}<0.3$ (7)

That is, if the lower limit of the condition (7) is exceeded, it will become difficult to keep the back focal length long, and if the upper limit of the condition (7) is exceeded, the correction of astigmatism and distortion aberration at the wide angle end will become difficult. Also, by adopting such a design in which the lens thickness of the negative lens is made great, the off-axis light ray on the greatly conjugate side surface of the negative lens is bent in the off-axis direction and therefore, the correction of distortion aberration on the image side surface of the negative lens can be accomplished by a construction in which the air space is shorter than the air space in the condition (6).

Numerical value embodiments of the present invention will now be shown. In the numerical value embodiments below, Ri represents the radius of curvature of the ith lens surface from the screen side, Di represents the lens thickness and air space of the ith lens from the screen side, and Ni and νi represent the refractive index and Abbe number, respectively, of the glass of the ith lens from the screen side.

In Embodiments 1-5, focusing is effected by the first lens unit I being moved along the optic axis. Also, the spacing when the screen distance is ∞ is shown as a variable spacing D8.

The values of the respective numerical value embodiments corresponding to respective numerical value conditions are shown in the table below.

| | Embodiment 1 | Embodiment 2 | Embodiment 3 | Embodiment 4 | Embodiment 5 |
| --- | --- | --- | --- | --- | --- |
| Condition (1) | 1.83 | 1.82 | 1.91 | 2.20 | 2.00 |
| Condition (2) | 1.14 | 1.01 | 1.05 | 1.60 | 1.01 |
| Condition (3) | 1.11 | 1.19 | 1.35 | 1.06 | 1.27 |
| Condition (5) | 2.73 | 3.41 | 3.52 | 3.05 | 1.67 |

Numberical Value Embodiment 1

F = 67.38~121.29   FNO = 1:4.04~5.08   2W = 30.0°~16.8°

| | | |
| --- | --- | --- |
| R1 = 53.879 | D1 = 2.40 | N1 = 1.71615  ν1 = 53.8 |
| R2 = 29.878 | D2 = 11.04 | |
| R3 = −79.012 | D3 = 2.00 | N2 = 1.72341  ν2 = 50.3 |
| R4 = 98.533 | D4 = 0.50 | |
| R5 = 57.102 | D5 = 3.99 | N3 = 1.70443  ν3 = 30.1 |
| R6 = −222.256 | D6 = Variable | |
| R7 = 68.177 | D7 = 5.60 | N4 = 1.69979  ν4 = 55.5 |
| R8 = 544.458 | D8 = 27.10 | |
| R9 = −38.566 | D9 = 4.50 | N5 = 1.76859  ν5 = 26.5 |
| R10 = 260.400 | D10 = 1.33 | |
| R11 = −348.410 | D11 = 6.66 | N6 = 1.72341  ν6 = 50.3 |
| R12 = −47.202 | D12 = 0.15 | |
| R13 = 249.344 | D13 = 8.26 | N7 = 1.71615  ν7 = 53.8 |
| R14 = −78.072 | | |

| Variable spacing | Focal length | | |
| --- | --- | --- | --- |
| | 67.38 | 94.34 | 121.29 |
| D6 | 51.38 | 18.79 | 0.69 |

Numerical Value Embodiment 2

F = 67.53~121.55   FNO = 1:3.13~4.08   2W = 29.8°~16.8°

| | | |
| --- | --- | --- |
| R1 = 305.877 | D1 = 3.20 | N1 = 1.51825  ν1 = 64.1 |
| R2 = −305.877 | D2 = 0.15 | |
| R3 = 46.808 | D3 = 2.40 | N2 = 1.71615  ν2 = 53.8 |
| R4 = 29.830 | D4 = 11.90 | |
| R5 = −59.391 | D5 = 2.00 | N3 = 1.72341  ν3 = 50.3 |
| R6 = 104.139 | D6 = 0.50 | |
| R7 = 63.525 | D7 = 4.30 | N4 = 1.70443  ν4 = 30.1 |
| R8 = −347.662 | D8 = Variable | |
| R9 = 164.553 | D9 = 4.40 | N5 = 1.69979  ν5 = 55.5 |
| R10 = −93.213 | D10 = 1.87 | |
| R11 = −48.941 | D11 = 2.20 | N6 = 1.51977  ν6 = 52.4 |
| R12 = −96.441 | D12 = 23.10 | |
| R13 = −57.136 | D13 = 4.50 | N7 = 1.76859  ν7 = 26.5 |

-continued

Numerical Value Embodiment 2

| | | |
|---|---|---|
| R14 = 242.797 | D14 = 1.54 | |
| R15 = −399.533 | D15 = 5.15 | N8 = 1.72341  $\nu 8$ = 50.3 |
| R16 = −60.255 | D16 = 0.15 | |
| R17 = 302.634 | D17 = 7.40 | N9 = 1.71615  $\nu 9$ = 53.8 |
| R18 = −69.357 | | |

| Variable spacing | Focal length | | |
|---|---|---|---|
| | 67.53 | 94.54 | 121.55 |
| D8 | 50.35 | 18.33 | 0.54 |

Numerical Value Embodiment 3

F = 64.38~122.31    FNO = 1:3.13~4.02    2W = 31.2°~16.8°

| | | |
|---|---|---|
| R1 = 127.181 | D1 = 3.65 | N1 = 1.51825  $\nu 1$ = 64.1 |
| R2 = 1675.586 | D2 = 0.15 | |
| R3 = 53.831 | D3 = 2.40 | N2 = 1.71615  $\nu 2$ = 53.8 |
| R4 = 31.903 | D4 = 13.38 | |
| R5 = −75.273 | D5 = 2.00 | N3 = 1.72341  $\nu 3$ = 50.3 |
| R6 = 97.047 | D6 = 0.15 | |
| R7 = 61.114 | D7 = 5.00 | N4 = 1.70443  $\nu 4$ = 30.1 |
| R8 = −484.365 | D8 = Variable | |
| R9 = 141.192 | D9 = 4.50 | N5 = 1.69979  $\nu 5$ = 55.5 |
| R10 = −99.292 | D10 = 1.44 | |
| R11 = −56.750 | D11 = 5.00 | N6 = 1.51977  $\nu 6$ = 52.4 |
| R12 = −155.115 | D12 = 21.35 | |
| R13 = −53.441 | D13 = 5.00 | N7 = 1.76859  $\nu 7$ = 26.5 |
| R14 = 256.296 | D14 = 1.46 | |
| R15 = −393.012 | D15 = 8.45 | N8 = 1.72341  $\nu 8$ = 50.3 |
| R16 = −59.587 | D16 = 0.15 | |
| R17 = 310.345 | D17 = 6.85 | N9 = 1.71615  $\nu 9$ = 53.8 |
| R18 = −74.500 | | |

| Variable spacing | Focal length | | |
|---|---|---|---|
| | 64.38 | 93.34 | 122.31 |
| D8 | 69.27 | 22.84 | −1.60 |

Numerical Value Embodiment 4

F = 55.65~106.85    FNO = 1:3.13~3.89    2W = 35.8°~19.2°

| | | |
|---|---|---|
| R1 = 134.720 | D1 = 5.27 | N1 = 1.51825  $\nu 1$ = 64.1 |
| R2 = 484.537 | D2 = 0.20 | |
| R3 = 62.211 | D3 = 2.00 | N2 = 1.71615  $\nu 2$ = 53.8 |
| R4 = 30.785 | D4 = 13.45 | |
| R5 = −79.625 | D5 = 2.00 | N3 = 1.79012  $\nu 3$ = 44.2 |
| R6 = 128.038 | D6 = 0.20 | |
| R7 = 62.813 | D7 = 9.00 | N4 = 1.70443  $\nu 4$ = 30.1 |
| R8 = −256.127 | D8 = Variable | |
| R9 = 160.172 | D9 = 7.78 | N5 = 1.69979  $\nu 5$ = 55.5 |
| R10 = −91.804 | D10 = 2.10 | |
| R11 = −60.358 | D11 = 3.00 | N6 = 1.51825  $\nu 6$ = 64.1 |
| R12 = −180.722 | D12 = 32.28 | |
| R13 = −66.011 | D13 = 4.00 | N7 = 1.79191  $\nu 7$ = 25.7 |
| R14 = 349.936 | D14 = 2.49 | |
| R15 = −193.410 | D15 = 5.68 | N8 = 1.71615  $\nu 8$ = 53.8 |
| R16 = −60.540 | D16 = 0.20 | |
| R17 = 213.314 | D17 = 7.51 | N9 = 1.71615  $\nu 9$ = 53.8 |
| R18 = −89.905 | | |

| Variable spacing | Focal length | | |
|---|---|---|---|
| | 55.65 | 83.47 | 106.85 |
| D8 | 89.93 | 36.40 | 12.98 |

Numerical Value Embodiment 5

F = 65.02~130.06    FNO = 1:4.05~5.59    2W = 31.0°~15.8°

| | | |
|---|---|---|
| R1 = 48.514 | D1 = 2.40 | N1 = 1.71615  $\nu 1$ = 53.8 |
| R2 = 30.056 | D2 = 10.50 | |
| R3 = −76.715 | D3 = 2.00 | N2 = 1.72341  $\nu 2$ = 50.3 |
| R4 = 88.606 | D4 = 0.50 | |
| R5 = 56.527 | D5 = 4.47 | N3 = 1.70443  $\nu 3$ = 30.1 |
| R6 = −206.284 | D6 = Variable | |

-continued

Numerical Value Embodiment 5

| | | |
|---|---|---|
| R7 = 65.024 | D7 = 6.80 | N4 = 1.69979  $\nu 4$ = 55.5 |
| R8 = −608.465 | D8 = 3.78 | |
| R9 = −45.590 | D9 = 16.51 | N5 = 1.76859  $\nu 5$ = 26.5 |
| R10 = 190.642 | D10 = 1.64 | |
| R11 = −249.375 | D11 = 6.72 | N6 = 1.72341  $\nu 6$ = 50.3 |
| R12 = −51.727 | D12 = 0.15 | |
| R13 = −5091.715 | D13 = 3.57 | N7 = 1.71615  $\nu 7$ = 53.8 |
| R14 = −79.922 | | |

| Variable spacing | Focal length | | |
|---|---|---|---|
| | 65.03 | 97.54 | 130.06 |
| D6 | 61.70 | 20.44 | −0.19 |

As described above, by specifying the arrangement of the refractive powers of a zoom lens which has in succession from the screen side a first lens unit of negative refractive power and a second lens unit of positive refractive power and in which the second lens unit is moved toward the screen side to thereby effect magnification change from the wide angle end to the telephoto end, there can be achieved a zoom lens of long back focal length, and such zoom lens can be used as a projection lens for color liquid crystal projection TV.

We claim:

1. A zoom lens including, in succession from the greatly conjugate side to the little conjugate side, a first lens unit having negative refractive power, and a second lens unit having positive refractive power, zooming from the wide angle side to the telephoto side being effected by at least said second lens unit being moved toward the greatly conjugate side, said zoom lens satisfying the following condition:

$$bf_w/f_w > 1.6,$$

where $f_w$ is the focal length for the entire system at the wide angel end, and $bf_w$ is the distance from the last lens surface of said second lens unit to the little conjugate side, and said zoom lens further satisfies the following conditions:

$$0.8 < -e_w/f_I < 2$$

$$1 < -f_I/f_{II} < 1.5,$$

where $f_I$ and $f_{II}$ are the focal lengths of the said first lens unit and said second lens unit, respectively, and $e_w$ is the principal point spacing between said first lens unit and said second lens unit at the wide angle end.

2. A zoom lens according to claim 1, wherein said second lens unit has at least one negative lens, and when with a negative lens of the strongest negative refractive power therein as the boundary, the focal length of a lens unit on the greatly conjugate side in said second lens unit is $f_{II1}$ and the focal length of a lens unit on the little conjugate side is $f_{II3}$, said zoom lens satisfies the following conditions:

$$f_{II1} > 0, f_{II3} > 0, 1 < f_{II1}/f_{II3} < 5.$$

3. A zoom lens according to claim 2, further satisfying the following condition:

$$0.25 < d/f_{II} < 0.4,$$

where d is the air space between said lens unit on the greatly conjugate side and a negative lens of the strongest negative refractive power in said second lens unit.

4. A zoom lens for projecting the image of display means forming an image onto a screen, including in succession from the screen side a first lens unit having negative refractive power, at least said second lens unit being moved toward the screen side during zooming from the wide angle side of the telephoto side, said zoom lens satisfying the following condition:

$$bf_w/f_w > 1.6,$$

where $f_w$ is the focal length of the entire system, and $bf_w$ is the distance from the last lens surface of said second lens unit to said display means, and said zoom lens further satisfies the following conditions:

$$0.8 < -e_w/f_I < 2$$

$$1 < -f_I/f_{II} < 1.5,$$

where $f_I$ and $f_{II}$ are the focal lengths of said first lens unit and said second lens unit, respectively, and $e_w$ is the principal point spacing between said first lens unit and said second lens unit.

5. A zoom lens according to claim 4, wherein said second lens unit has at least one negative lens, and when with a negative lens of the strongest negative refractive power therein as the boundary, the focal length of a lens unit in said second lens unit which is adjacent to said screen is $f_{II1}$ and the focal length of a lens unit which is adjacent to said display means is $f_{II3}$, said zoom lens satisfies the following condition:

$$f_{II1} > 0, f_{II3} > 0, 1 < f_{II1}/f_{II3} < 5.$$

6. A zoom lens according to claim 4, further including a dichroic mirror disposed between said second lens unit and said display means.

7. A zoom lens including in succession from a screen a first lens unit having negative refractive power, and a second lens unit having positive refractive power, zooming being effected by at least said second lens unit being moved toward the screen side, said second lens unit having a negative lens of the strongest negative refractive power in said second lens unit, and having a lens sub-unit on the screen side of said negative lens, said second lens unit satisfying the following condition:

$$0.25 < d/f_{II} < 0.4,$$

where d is the air space between said lens sub-unit and said negative lens in the second lens unit, and $f_{II}$ is the focal length of said second lens unit.

8. A zoom lens according to claim 7, satisfying the following conditions:

$$0.8 < -e_w/f_I < 2$$

$$1 < -f_I/f_{II} < 1.5,$$

where $e_w$ is the principal point spacing between said first lens unit and said second lens unit at the wide angle end, and $f_{II}$ is the focal length of said second lens unit.

* * * * *

UNITED STATES PATENT AND TRADEMARK OFFICE
CERTIFICATE OF CORRECTION

PATENT NO. : 5,179,473
DATED : January 12, 1993
INVENTOR(S) : KOUTARO YANO, ET AL.

It is certified that error appears in the above-identified patent and that said Letters Patent is hereby corrected as shown below:

COLUMN 2:

Line 6, "$bf_w/f_2 > 1.6 \quad (1)$" should read --$bf_w/f_w > 1.6 \quad (1)$--.

Column 6:

Line 39, "angel" should read --angle--.

Column 8:

Line 21, "the second" should read --said second--.

Signed and Sealed this

Seventeenth Day of January, 1995

Attest:

BRUCE LEHMAN

*Attesting Officer*   *Commissioner of Patents and Trademarks*